United States Patent [19]

Suzuki et al.

[11] 4,129,854
[45] Dec. 12, 1978

[54] CELL CLASSIFICATION METHOD

[75] Inventors: Ryuichi Suzuki, Kokubunji; Akihide Hashizume, Hachioji; Hideyuki Horiuchi, Kokubunji; Shinji Yamamoto; Hisatake Yokouchi, both of Hachioji, all of Japan

[73] Assignee: Hitachi, Ltd., Japan

[21] Appl. No.: 844,312

[22] Filed: Oct. 21, 1977

[30] Foreign Application Priority Data

Oct. 25, 1976 [JP] Japan .................. 51-127240
Oct. 25, 1976 [JP] Japan .................. 51-127245

[51] Int. Cl.² ............... G06K 9/00; G01N 33/16
[52] U.S. Cl. ................. 340/146.3 CA; 235/92 PC; 356/39; 364/416
[58] Field of Search ............ 340/146.3 B, 146.3 AC, 340/146.3 CA; 364/416, 515, 526, 555; 250/226, 222 PC; 356/39-42; 235/92 PC

[56] References Cited

U.S. PATENT DOCUMENTS

| 3,315,229 | 4/1967 | Smithline | 235/92 PC |
| 3,827,804 | 8/1974 | Miller et al. | 356/39 |
| 3,851,156 | 11/1974 | Green | 364/416 |
| 3,968,351 | 7/1976 | Baker | 235/92 PC |
| 3,973,725 | 8/1976 | Watanabe et al. | 364/416 |

Primary Examiner—Leo H. Boudreau
Attorney, Agent, or Firm—Craig & Antonelli

[57] ABSTRACT

A method wherein at least one standard leukocyte is selected from within a blood film in advance, the values of adjustments are calculated on the basis of the differences between a plurality of characteristic parameters evaluated from the standard leukocyte and the corresponding characteristic parameters previously given, and the characteristic parameters of the other leukocytes in the particular blood film are adjusted with these values of adjustments. Further, using the adjusted characteristic parameters, secondary characteristics are derived.

10 Claims, 16 Drawing Figures

FIG. 1a
(a) STANDARD WBC

FIG. 1b
(b) OBSERVED WBC

CELL CLASSIFICATION METHOD

BACKGROUND OF THE INVENTION

1. Field of the Invention

This invention relates to a method wherein a large number of kinds of cells existent in a smeared cell sample are classified by utilizing characteristic parameters on the shape information and density information of the cells. More particularly, it relates to a method of compensating for the variances of the characteristic parameters among cell samples, and a method of calculating secondary characteristic parameters.

2. Description of the Prior Art

In recent years, as seen in an automated cyto-screening system, an automated leukocyte analyzer etc., it has been vigorously carried out that characteristics of the shapes and densities of cells are automatically detected with the procedure of pattern recognition, thereby to classify the cells precisely and speedily.

In these systems, a good preparation of a cell sample is one of essential points for enhancing the accuracy of the classification of cells. The process of preparing the cell sample is generally divided into a smearing step and a staining step. It is impossible to subject all the cell samples to the same smearing condition and staining condition. Therefore, variances occur in shape and density (color) characteristics among the cell samples prepared. In the smearing step, drying after smearing is included. If the drying time becomes long, the size (area and peripheral length) of the cell existent in the cell sample will decrease. In the staining step, the color density of the cell existent in the cell sample will vary in dependence on the amount of a staining matter for staining, the staining time, the extent of washing after the staining, etc. It is obvious that such variances of the shape and density (color) characteristics among the cell samples degrade the accuracy of recognition or classification in the system as referred to above.

SUMMARY OF THE INVENTION

It is an object of this invention to compensate for the variances of each cell sample in order that a high factor of recognition may be achieved even when the shape and density characteristics vary among cell samples.

To accomplish the object, the present invention provides a method wherein characteristic parameters based on the shape and color (density) characteristics of a plurality of sorts of cells existent in a cell sample are extracted and wherein the cells are classified by the use of the characteristic parameters, characterized in that at least one cell of a proper sort (standard cell) is artificially selected from among the plurality of sorts of cells, that unstable characteristic parameters among the characteristic parameters of the selected standard cell and standard values of the unstable characteristic parameters as obtained beforehand are compared, the resultant differences being made adjustment values for the unstable characteristic parameters in the cell sample, and that the unstable characteristic parameters of the remaining cells are adjusted with the adjustment values.

Further, according to this invention, the standard cell is automatically selected by utilizing those of a plurality of characteristic parameters which are comparatively stable among cell samples, and the characteristic parameters of the remaining cells are adjusted with respect to such standard cell.

In another aspect of performance of this invention, in calculating the values of adjustments, a plurality of standard cells existent in the cell sample are selected, the average of the unstable characteristic parameters of these standard cells is taken, and the average value is compared with a standard value previously given. This enhances the accuracy of the adjustment value, in turn, the accuracy of recognition still more.

DESCRIPTION OF THE PREFERRED EMBODIMENTS

Hereunder, this invention will be described by taking as an example a case where the object cell to be recognized is a white blood corpuscle.

Figure 1A:
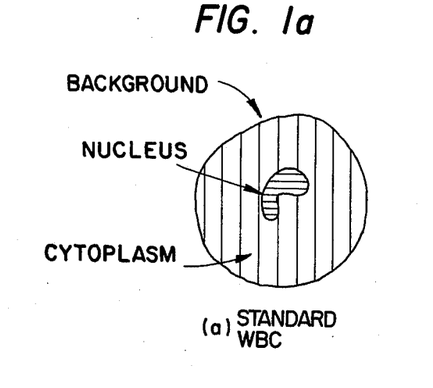
FIGS. 1a and 1b are views showing leukocytal images in a model-like fashion.
Figure 1B:
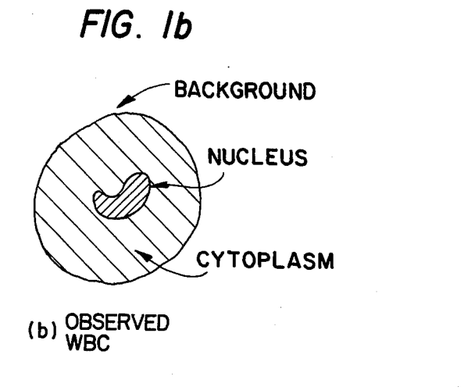

FIGS. 1a and 1b illustrate leukocytal images in a model-like fashion. FIG. 1a shows a standard pattern, and FIG. 1b an observed pattern. As shown in the figures, the leukocyte is composed of a nucleus and a cytoplasm, which are stained and have different colors. Leukocytes are classified into six sorts in dependence on the nuclear shape, size and density and the cytoplasmic size and color tone.

The constructions of automated leukocyte analyzers for use in such classification of leukocytes are known from, for example, inventions disclosed in Japanese Patent Application Public-disclosures Nos. 75047/1974, 93095/1974, 19531/1975, 67194/1975, 67915/1975, and 33695/1976. Therefore, they will not be described in detail and will be briefly explained here. A sample which is a blood film prepared on a slide glass has its image magnified with a microscope. The magnified image is picked up and converted into electric signals by an image pickup device through band-pass filters for green (G), red (R) and blue (B). These electric signals are subjected to analog-to-digital conversions, to obtain primary data. Characteristic parameters such as nuclear size, cytoplasmic size, nuclear peripheral length, and cytoplasmic densities and nuclear densities at the respective wavelengths of red and green, are extracted from the primary data for each leukocyte. Using these characteristic parameters, the leukocytes are classified.

Figure 2:
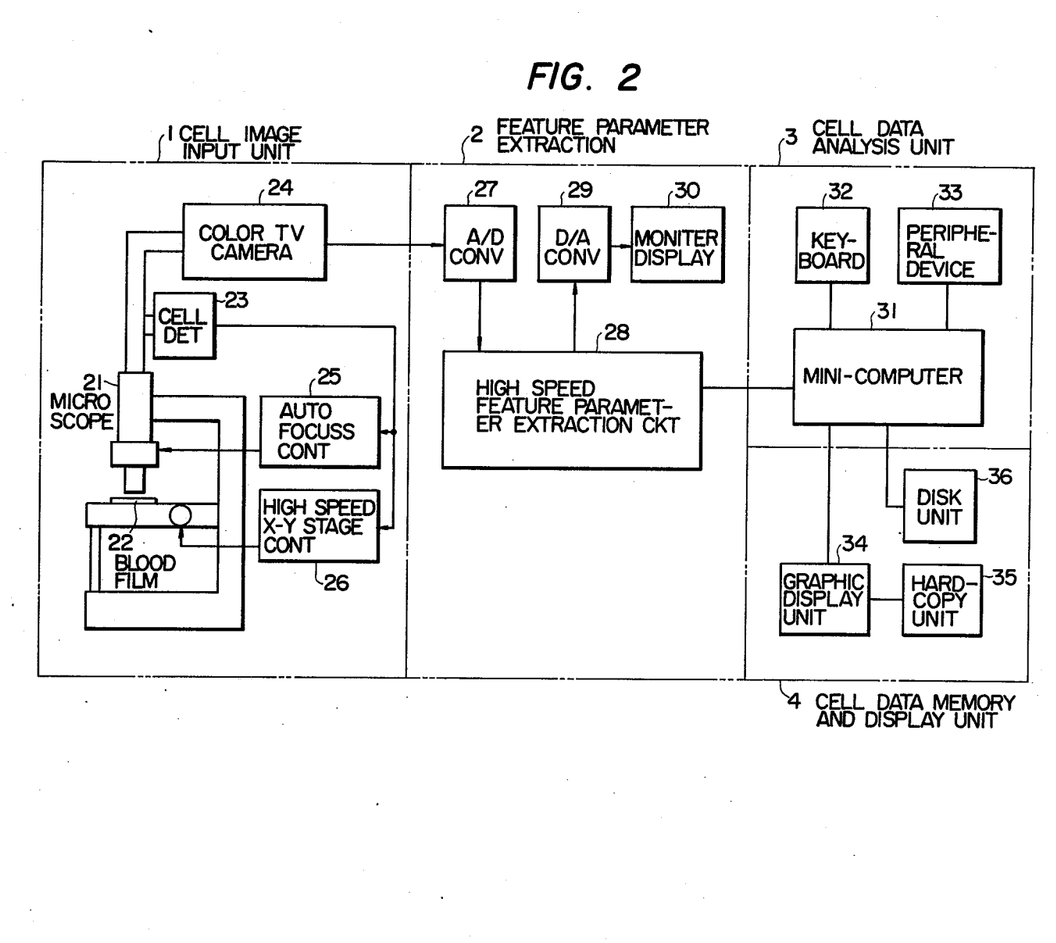
FIG. 2 is a block diagram showing a know system for carrying out the recognition and classification of lekocytes.

An example of the schematic construction of a known, automated leukocyte analyzer for performing the above method is shown in FIG. 2. Referring to the figure, numeral 1 designates a cell image input unit, which includes a microscope 21. A blood film 22 is placed on the slide glass of the microscope 21. Owing to a cell detector 23, an autofocusing mechanism 25 and a high-speed X-Y stage mechanism 26, leukocytes which lie sporadically in the cell sample 22 are automatically detected, the slide glass is automatically moved so that the sample may fall into the field of vision of a color TV camera 24, and the focusing is automatically executed. Thus, arrangements for an image processing are made. Numeral 2 designates a characteristic parameter extraction unit. A red image signal (R signal), a blue image signal (B signal) and a green image signal (G signal) from the color TV camera 24 are respectively subjected to analog-to-digital conversions by an analog-to-digital conversion unit 27. The resultant signals are entered into a characteristic parameter extractor 28. The characteristic parameter extractor 28 carries out the image processing for calculating the characteristic parameters on the shape, density, etc. Numeral 29 indicates a digital-to-analog converter, and numeral 30 a monitor television set. Numeral 3 designates a data analysis unit which carries out a classification and statistics processing with the characteristic parameters calculated by the characteristic parameter extraction unit 2. Numeral 31 indicates a computer such as mini-computer, numeral 32 a keyboard for auxiliary data, and numeral 33 other peripheral equipments. In general, the computer 31 serves also for the control of the whole apparatus. Numeral 4 designates an external memory and display unit for the cell image data obtained. Numeral 34 indicates a graphic display unit, numeral 35 a hard-copy unit, and numeral 36 a magnetic disk unit.

As previously stated, in case where the leukocytes are classified in such apparatus by the use of the characteristic parameters on the shapes, densities etc. of the leukocytes, variances in the density information etc. among the samples are great, so that the characteristic parameters become unstable and that the factor of recognition lowers.

In this invention, a neutrophil leukocyte is selected as the standard leukocyte. The selection of the neutrophil leukocyte is done manually or automatically. In the manual selection, observation is relied on. The automatic selection employs the nuclear size, the cytoplasmic size and the nuclear peripheral length which are comparatively stable characteristic parameters.

This invention will now be explained in connection with the case of selecting the standard leukocyte, i.e., the neutrophil leukocyte by the use of the comparatively stable characteristic parameters.

Among the stable characteristic parameters of the leukocytes, the nuclear size signal is denoted by NS, the cytoplasmic size signal by CS, and the nuclear peripheral length signal PL. As characteristic parameters, which require adjustments, the density signals of the nucleus, the cytoplasm and the background based on the red filter and the green filter are denoted by $n_R$, $c_R$ and $B_R$ and by $n_G$, $c_G$ and $B_G$, respectively.

Methods for calculating these characteristic parameters are known from the publicly-disclosed inventions mentioned earlier, and are omitted from the description.

Figure 3A:
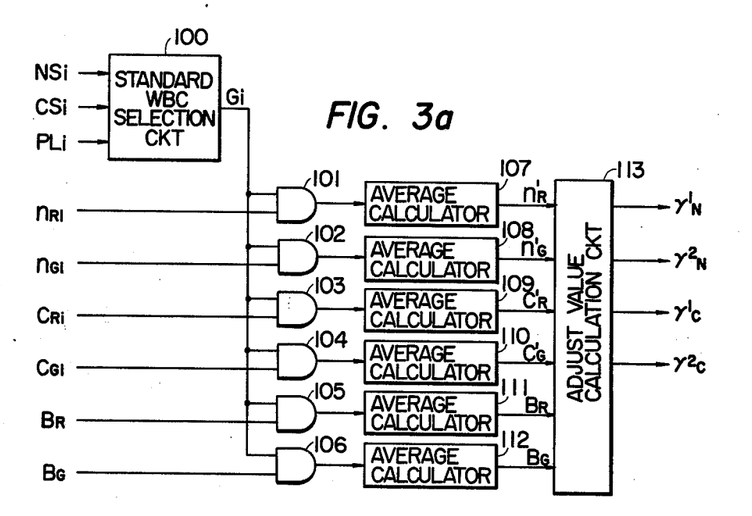
FIGS. 3a and 3b are block diagrams showing an embodiment of apparatus for use in the performance of this invention.
Figure 3B:
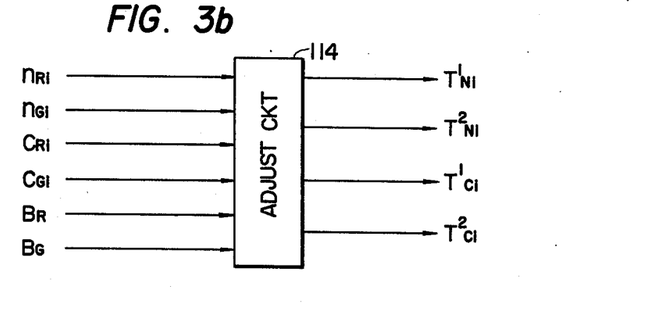

FIGS. 3a and 3b are circuit diagrams which illustrate an embodiment of apparatus for use in the performance of the method according to this invention. FIG. 3a shows a circuit for selecting the standard leukocyte, and circuit for calculating an amount of adjustment. FIG. 3b shows a circuit for adjusting an observed leukocyte. A standard leukocyte-selecting circuit 100 selects the standard leukocyte on the basis of the signals $NS_i$, $CS_i$ and $PL_i$ (where i represents 1 or greater integers) of the observed leukocytes. Only at the time of the standard leukocyte, gate 101-106 are enabled, to enter the density parameters into corresponding average calculating circuits 107-112. On the basis of the resultant average values, an adjustment value-calculating circuit 113 evaluates the amounts of adjustments $\gamma_N^1$, $\gamma_N^2$ and $\gamma_C^1$, $\gamma_C^2$. Subsequently, the density parameters of each observed leukocyte is adjusted by an adjusting circuit 114, to obtain characteristic parameters $T^1 n_i$, $T^2 n_i$ and $T^1 c_i$, $T^2 c_i$.

Figures 4, 5A:
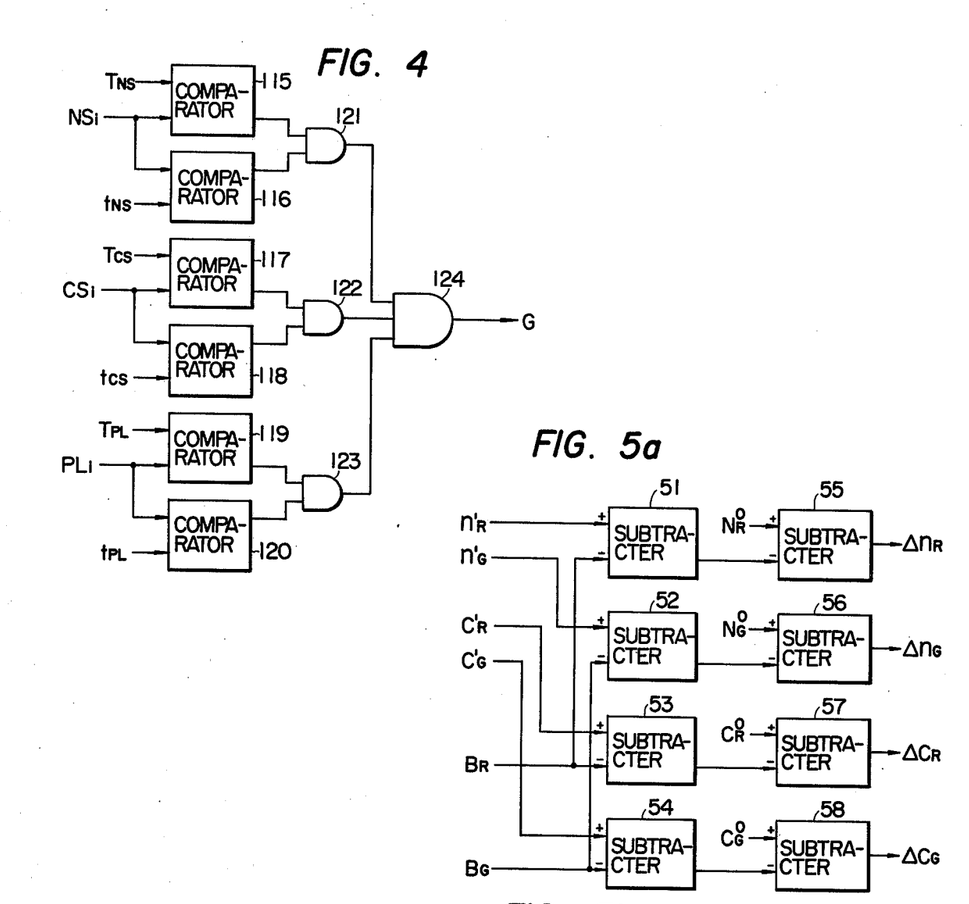
FIG. 4, FIGS. 5a and 5b, and FIGS. 6a and 6b are block diagrams showing the arrangements of embodiments of essential portions in the apparatus shown in FIGS. 3a and 3b.
Figure 5B:
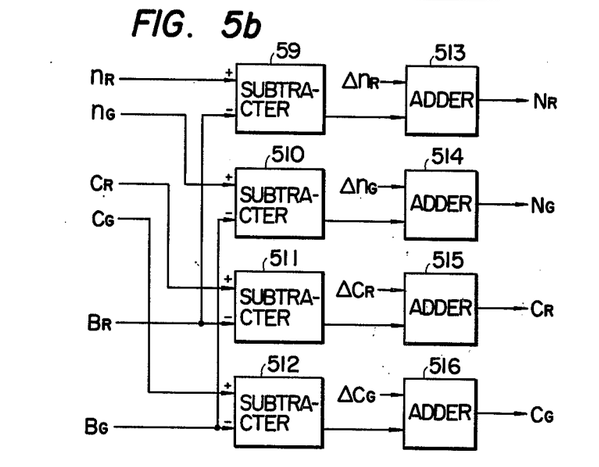
Figure 6A:
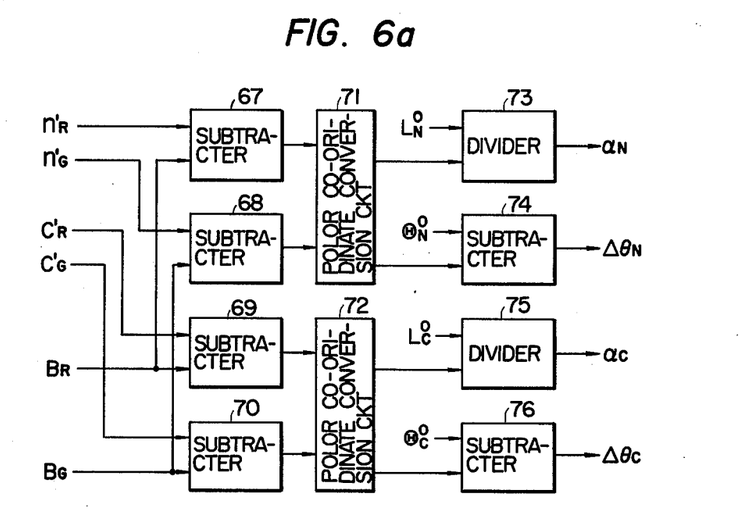
Figure 6B:
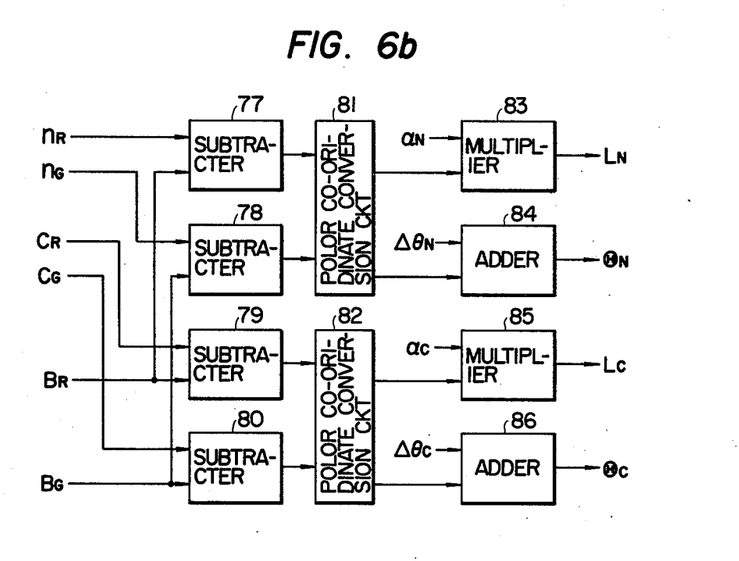

FIG. 4 shows the arrangement of the standard leukocyte-selecting circuit 100. FIGS. 5a and 5b are block diagrams wherein the adjustment value-calculating circuit 113 shown in FIG. 2a and the adjusting circuit 114 shown in FIG. 2b are respectively put into arrangements which execute operations of the Cartesian coordinates system. FIG. 6a is a block diagram in the case where the adjustment value-calculating circuit 113 is put into an arrangement which executes operations of the polar coordinates system, while FIG. 6b is a block diagram in the case where the adjusting circuit 114 is put into an arrangement which executes operations of the polar coordinates system.

In selecting the neutrophil leukocyte as the standard leukocyte, whether or not the parameters $NS_i$, $CS_i$ and $PL_i$ of the leukocyte lie within ranges of from lower limits $t_{NS}$, $t_{CS}$ and $t_{PL}$ to upper limits $T_{NS}$, $T_{CS}$ and $T_{PL}$, respectively is investigated. These boundary values can be given in advance. In the arrangement of FIG. 4, $T_{NS} > NS$ is checked by a comparator 115, and $NS > t_{NS}$ by a comparator 116. Only when both the conditions are fulfilled, an AND circuit 121 is enabled. Likewise, $t_{CS} < CS < T_{CS}$ and $t_{PL} < PL < T_{PL}$ are checked by comparators 117 and 118 and comparators 119 and 120, and only when the conditions are met, AND circuits 122 and 123 are enabled, respectively. Only when all the requisites are satisfied, an AND circuit 124 is enabled, and it is detected that the particular leukocyte is the standard leukocyte.

Now, a method for calculating the amount of adjustment and a method for adjusting the density parameter will be described.

Let $n_R'$ and $c_R'$ denote the density signals of the nucleus and the cytoplasm of the standard leukocyte by the red filter, respectively. Let $n_G'$ and $c_G'$ denote the density signals of the nucleus and the cytoplasm by the green filter, respectively. Let $B_R$ denote the density signal of the background by the red filter, and $B_G$ denote the density signal thereof by the green filter. Signals representative of the amounts of adjustments of the densities of the nucleus and the cytoplasm are evaluated from the relations of the above-mentioned signals $n_R'$, $n_G'$; $c_R'$, $c_G'$; and $B_R$, $B_G$, and standard values previously given.

In this invention, the amounts of adjustments and the adjusted characteristic parameters are evaluated as to the Caretsian coordinates system and the polar coordinates system. In the Cartesian coordinates system, the amounts of adjustments $\gamma_N^1$, $\gamma_N^2$, $\gamma_C^1$, $\gamma_C^2$ and the adjusted characteristic parameters $T^1 n$, $T^2 n$, $T^1 c$, $T^2 c$ are represented by $\Delta n_R$, $\Delta n_G$, $\Delta c_R$, $\Delta c_G$ and $N_R$, $N_G$, $C_R$, $C_G$. On the other hand, in the polar coordinates system, the amounts of adjustments $\gamma_N^1$, $\gamma_N^2$, $\gamma_C^1$, $\gamma_C^2$ and the adjusted characteristic parameters $T^1_N$, $T^2_N$, $T^1_C$, $T^2_C$ are represented by $\alpha_N$, $\Delta\theta_N$, $\alpha_C$, $\Delta\theta_C$ and $L_N$, $\theta_N$, $L_C$, $\theta_C$.

The adjustments in Cartesian coordinates system are as stated below. Letting the standard values of the densities of the nucleus and the cytoplasm of the nucleus and the cytoplasm of the standard leukocyte by the red filter and by the green filter be $N_R^0$, $C_R^0$ and $N_G^0$, $N_G^0$, respectively, and letting the amounts of adjustments concerning the red filter and the green filter the $\Delta n_R$, $\Delta c_R$ and $\Delta n_G$, $\Delta c_G$, respectively, the adjustment values are obtained by the following equations:

$$\Delta n_R = N_R^0 - (n_R' - B_R)$$

$$\Delta n_G = N_G^0 - (n_G' - B_G)$$

$$\Delta c_R = C_R^0 - (C_R' - B_R)$$

$$\Delta c_G = C_G^0 - (C_G' - B_g)$$

Such operations are executed by the circuit arrangement shown in FIG. 5a. That is, the difference between the nuclear density $n_R'$ of the standard leukocyte by the red filter and the background $B_R$ of the red filter is evaluated by a subtracter 51. This output is subtracted from the previously given standard value $N_R^0$ with a subtracter 55. Thus, the amount of adjustment $\Delta n_R$ is obtained. Similarly, the other amounts of adjustments of the densities, $\Delta n_G$, $\Delta c_R$ and $\Delta c_G$ are obtained.

In FIG. 5a, numerals 52, 53, 54, 56, 57 and 58 designate subtracters, respectively.

Subsequently, using the amounts of adjustments $\Delta r_R$, $\Delta n_G$, $\Delta c_R$, $\Delta c_G$, the densities of another leukocyte observed are adjusted. Letting $N_R$ and $N_G$ denote the adjusted densities of the nucleus of the leukocyte observed through the red filter and the green filter, respectively, and letting $C_R$ and $C_G$ denote the adjusted densities of the cytoplasm observed through the red filter and the green filter, respectively, the following equations hold:

$$N_R = (n_R - B_R) + \Delta n_R$$

$$N_G = (n_G - B_G) + \Delta n_G$$

$$C_R = (c_R - B_R) + \Delta c_R$$

$$C_G = (c_G - B_G) + \Delta c_G$$

Such operations are executed by the circuit arrangement shown in FIG. 5b. That is, the difference between the nuclear density $n_R$ and the background density $B_R$ of the observed leukocyte by the red filter is evaluated by a subtracter 59. The amount of adjustment $\Delta n_R$ is added to the resultant value by an adder 513. Thus, the adjusted density $N_R$ is obtained. Similarly, the other adjusted densities $N_G$, $C_R$ and $C_G$ are obtained.

In FIG. 5b, numerals 510, 511 and 512 indicate subtracters, and numerals 514, 515 and 516 indicate adders, respectively.

The adjustments employing the polar coordinates system are as stated below. Letting $L_N^0$ and $L_C^0$ denote the standard absolute-value lengths of color vectors, previously evaluated, of the nucleus and the cytoplasm respectively, and $\theta_N^0$ and $\theta_C^0$ denote the standard angles of the color vectors, previously evaluated, of the nucleus and the cytoplasm respectively, the amounts of adjustments $\alpha_N$, $\alpha_C$, $\Delta\theta_N$ and $\Delta\theta_C$ are evaluated by the following equations:

$$\alpha_N = L_N^0/\{(n_R' - B_R)^2 + (n_G' - B_G)^2\}^{1/2}$$

$$\Delta\theta_N = \theta_N^0 - \tan^{-1}\{(n_R' - B_R)/(n_G' - B_G)\}$$

$$\alpha_C = L_C^0/\{(c_R' - B_R)^2 + (c_G' - B_G)^2\}^{1/2}$$

$$\Delta\theta_C = \theta_C^0 - \tan^{-1}\{(c_R' - B_R)/(c_G' - B_G)\}$$

The adjusted characteristic parameters of the observed laukocyte are evaluated as follows:

$$L_N = \alpha_N \cdot \{(n_R - B_R)^2 + (n_G - B_G)^2\}^{1/2}$$

$$\theta_N = \Delta\theta_N + \tan^{-1}\{(n_R - B_R)/(n_G - B_G)\}$$

$$L_C = \alpha_C \cdot \{(c_R - B_R)^2 + (c_G - B_G)^2\}^{1/2}$$

$$\theta_C = \Delta\theta_C + \tan^{-1}\{(c_R - B_R)/(c_G - B_G)\}$$

Such operations are executed by the circuit arrangements shown in FIGS. 6a and 6b. Referring to FIG. 6a, $(n_R' - B_R)$ is evaluated with a subtracter 67, and $(n_G' - B_G)$ is evaluated with a subtracter 68. Using a polar coordinates conversion circuit 71, $\{(n_R' - B_R)^2 + (n_G' - B_G)^2\}^{1/2}$ and $\tan^{-1}\{(n_R' - B_R)/(n_G' - B_G)\}$ are evaluated. Using a divider 73, the ratio between $L_N^0$ and the former is taken to obtain the amount of adjustment $\alpha_N$. On the other hand, using a subtracter 74, the difference between $\theta_N^0$ and the latter is taken to obtain the amount of adjustment $\Delta\theta_N$.

Likewise, the amounts of adjustments $\alpha_C$ and $\Delta\theta_C$ are obtained by using subtracters 69 and 70, a polar coordinates conversion circuit 72, a divider 75 and a subtracter 76.

Further, referring to FIG. 6b, $(n_R - B_R)$ is evaluated with a subtracter 77, and $(n_G - B_G)$ is evaluated with a subtracter 78. Using a polar coordinates conversion circuit 81, $\{(n_R - B_R)^2 + (n_G - B_G)^2\}^{1/2}$ and $\tan^{-1}\{(n_R - B_R)/(n_G - B_G)\}$ are evaluated. Using a multiplier 83, the product between $\alpha_N$ and the former is taken to obtain $L_N$. Using an adder 84, the sum between the latter and $\Delta\theta_N$ is taken to obtain $\theta_N$.

Likewise, the adjusted characteristic parameters $L_C$ and $\theta_C$ are obtained by using subtracters 79 and 80, a polar coordinates conversion circuit 82, a multiplier 85 and an adder 86.

Figure 7:
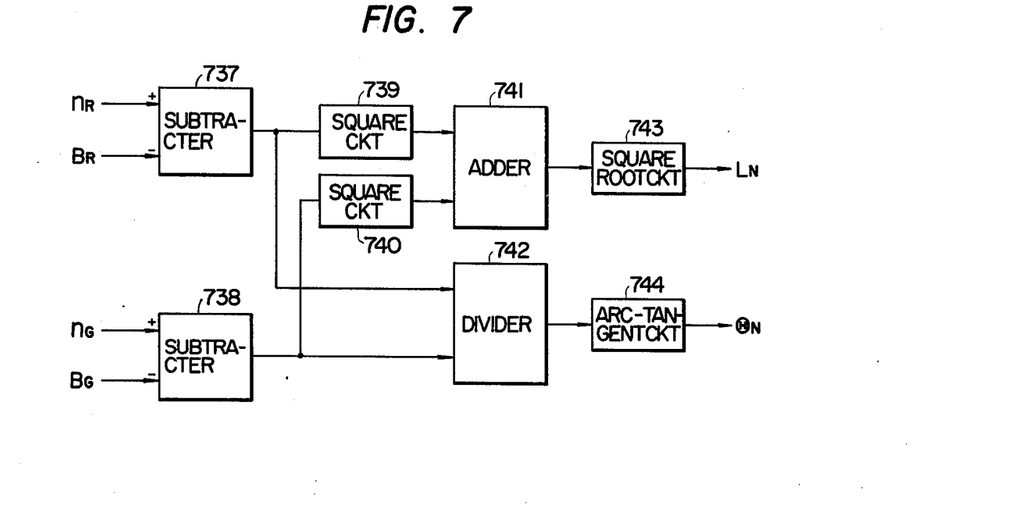
FIG. 7 is a block diagram showing the arrangement of an embodiment of an essential portion in the devices shown in FIGS. 6a and 6b, FIGS. 8a through 8d are model diagrams of a leukocyte for elucidating this invention.

FIG. 7 is a block diagram which illustrates the arrangement of the polar coordinates conversion circuits shown in FIGS. 6a and 6b. In the block diagram of FIG. 7, inputs are represented by $(n_R, B_R)$ and $(n_G, B_G)$, and outputs are represented by $L_N$ and $\theta_N$.

Referring to FIG. 7, the densities $n_R$ and $B_R$ are entered into a subtracter 737, to obtain the nuclear density $(n_R - B_R)$ with respect to the cytoplasmic density. Similarly, the densities $n_G$ and $B_G$ are entered into a subtracter 738, to obtain the nuclear density $(n_G - B_G)$. The respective outputs are entered into squaring circuits 739 and 740, and the resultant outputs are entered into an adder 741. The quantity $\{(n_R - B_R)^2 + (n_G - B_G)^2\}$ herein obtained is entered into a square root circuit 742, so that the output $L_N$ is provided. On the other hand, the outputs of the subtracters 737 and 738 are entered into a divider 743, to provide $(n_R - B_R)/(n_G - B_G)$. using this output $\theta_N$ is calculated with an inverse tangent circuit 744.

In the above description, the case of the special hardware has been referred to. Needless to say, however, the whole circuit arrangement from the standard leukocyte-selecting circuit 100 to the adjusting circuit 114 or a part thereof can be performed by the use of a general-purpose computer.

In this manner, the standard cell which is included among the plurality of observed cells in the sample is manually or automatically selected by the use of the comparatively stable characteristic parameters, and the characteristic parameters which are unstable among the samples are adjusted, whereby the variances of the characteristic parameters among the samples can be relieved, and the stabilization of the characteristic parameters can be automatically effected.

The above description has been devoted to the case where, in evaluating the characteristic parameters to be adjusted, the densities of the nucleus and the cytoplasm obtained through the red filter and those obtained through the green filter are employed. In order to further enhance the accuracy of classification, this invention can employ densities to be described below as regards the densities of the nucleus and the cytoplasm. That is, characteristic parameters on densities are evaluated with relative density signals which are obtained by subtracting the cytoplasmic density signals from the nuclear density signals acquired for the respective colors.

Figure 8A:
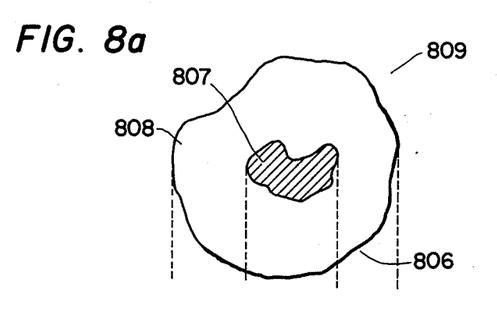
Figure 8B:
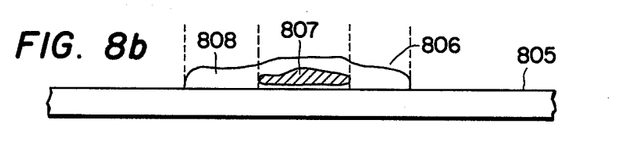
Figure 8C:
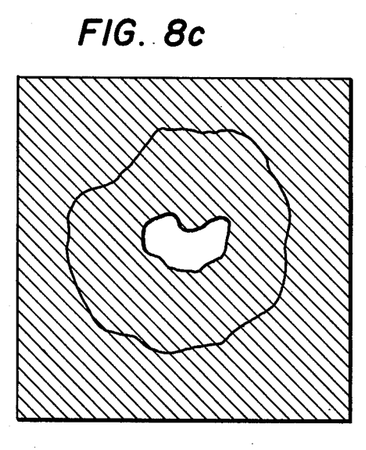
Figure 8D:
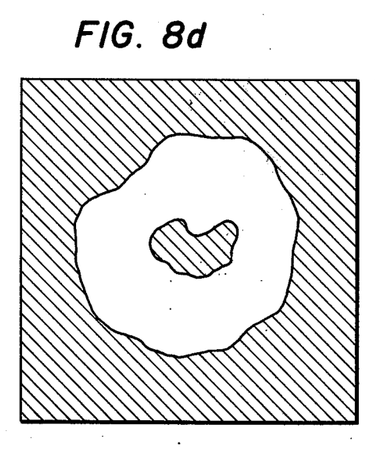

The employment of the relative density signals in this invention is based on the following reason. The relationship between the nuclear density signals as well as the cytoplasmic density signals and a leukocyte existent in an actual blood sample will now be explained with reference to FIGS. 8a to 8d. FIG. 8a shows one leukocyte 806 on a slide glass 805. Numeral 807 indicates the nucleus of the leukocyte 806, and numeral 808 the cytoplasm thereof. A portion 809 in which the leukocyte 806 does not exist indicates the background in an video signal. FIG. 8b is a sectional view taken along b- b' in FIG. 8a. FIG. 8c and FIG. 8d show a nucleus mask and a cytoplasm mask which correspond to the leukocyte shown in FIG. 8a, respectively. The nuclear density signals and the cytoplasmic density signals are obtained in such a way that, for example, light of red (R) obtained through the red filter and light of green (G) obtained through the green filter are transmitted through the leukocyte shown in FIG. 8a by interposing the respective masks shown in FIGS. 8c and 8d. More specifically, the summation of the densities of picture elements in the nucleus mask portion of red is evaluated, and it is divided by the total number of the picture elements in the nucleus mask portion. Then, the nuclear density signal for red $n_R$ is obtained. The nuclear density signal for green $n_G$, and the cytoplasmic density signals for red and green $c_R$ and $c_G$ are similarly obtained.

The nuclear density signals and the cytoplasmic density signals thus obtained, however, have a disadvantage as stated below. As apparent from the sectional structure of the leukocyte 806 shown in FIG. 8b, the nucleus overlies the cytoplasm. Therefore, the density information on the cytoplasm are mixed in the density information on the nucleus such as the nuclear density signal.

In this invention, accordingly, the relative density signals is obtained by subtracting the cytoplasmic density from the nuclear density signal of the leukocyte obtained for each color (wavelength), and a variation caused by the cytoplasmic density signal is removed. More specifically, letting $n_R$, $n_G$ and $c_R$, $c_G$ denote the nuclear and cytoplasmic density signals of the leukocyte evaluated from the image signals (R signal and G signal) obtained through the red filter and the green filter, the relative density signals for the respective colors are represented by $n_R - c_R$ and $n_G - c_G$. Regarding these signals $n_R - c_R$ and $n_G - c_G$, even if variances $c_R$ and $c_G$ exist in the cytoplamic density signals, it holds that $(n_R + \Delta c_R) - (c_R + \Delta c_R) = n_R - c_R$ and that $(n_G + \Delta c_G) - (c_G + \Delta c_G) = n_G - c_G$. Therefore, the relative density signals remain unchanged at all times.

According to this invention, in evaluating characteristic parameters on the densities of the leukocyte by the use of the relative density signals, the correlation between the two colors of red and green is taken into account. That is, according to this invention, the characteristic parameter on the densities is put into the Cartesian coordinates form:

$$\frac{n_R - c_R}{n_G - c_G} \quad (1)$$

or the polar coordinates form ($L_{CN}$, $\Theta_{CN}$):

$$\left. \begin{array}{l} L_{CN} = \{(n_R - c_R)^2 + (n_G - c_G)^2\}^{\frac{1}{2}} \\ \Theta_{CN} = \tan^{-1}\{(n_R - c_R)/(n_G - c_G)\} \end{array} \right\} \quad (2)$$

thereby to quantize the correlation between the colors.

Figure 9:
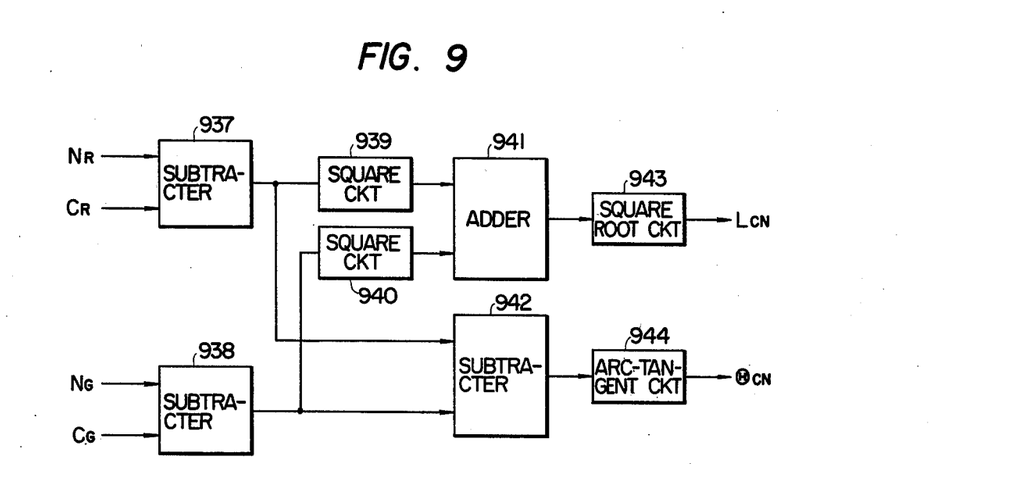
FIG. 9 is a block diagram showing the arrangement of an embodiment of a device for use in this invention.

FIG. 9 is a block diagram showing a circuit arrangement in the case where the characteristic parameter on the densities is calculated by the polar coordinates form represented by Eq. (2). Referring to FIG. 9, numerals 937 and 938 designate subtracter circuits, numerals 939 and 940 squaring circuits, numeral 941 an adder circuit, numeral 942 a divider circuit, numral 943 a square root circuit, and numeral 944 an inverse tangent circuit. The circuit arrangement realize Eq. (2), and calculates the characteristic parameters $L_{CN}$ and $\Theta_{CN}$.

In order to realize Eq. (1) and calculate the characteristic parameter, processings may be carried out in such a manner that the cytoplasmic density signal $c_R$ is subtracted from the nuclear density signal $n_R$ with a subtracter, that the cytoplasmic density signal $c_G$ is subtracted from the nuclear density signal $n_G$ with a subtracter, and that a division is executed by entering the results of the subtracters into a divider.

Amendments for the observed leukocyte are made by employing the characteristic parameter on the relative densities thus evaluated, i.e., the characteristic parameter indicated by Eq. (1) or Eq. (2). For the amendments in the Cartesian coordinates system, the foregoing quantities $N_R$, $N_G$, $C_R$ and $C_G$ may be used instead of the aforecited quantities of Eq. (1), $n_R$, $c_R$, $n_G$ and $c_G$. For the amendments in the polar coordinates system, values $L_N \sin\Theta_N$, $L_C \sin\Theta_C$, $L_N \cos\Theta_N$ and $L_C \cos H_C$ calculated from the foregoing quantities $L_N$, $\Theta_N$, $L_C$ and $\Theta_C$ may be used instead of the aforecited quantities of Eq. (2), $n_R$, $c_R$, $n_G$ and $c_G$.

The leukocyte recognition was carried out with such characteristic parameters $L_{CN}$ and $\Theta_{CN}$, and the result was as stated below.

The minimum distance method was employed as a recognition algorithm in a computer. In this method, the probability given in Eq. (3) at which an object leukocyte falls under any sort of leukocytes is relied on, and the particular leukocyte is recognized as being the sort i when $$\max_{i}\{* | i\}$$

is obtained (refer to, for excample, J. W. Bacuss: Leukocyte Recognition, IEEE Trans. on SMC 2, No. 4, 1972).

$$p(\mathbf{x}|i) = \frac{p(i)}{(2)^{n/2} |\Sigma_i|^{\frac{1}{2}}} \cdot \exp\left\{-\frac{1}{2}(\mathbf{x} - \mu_i)\Sigma^{-1}(\mathbf{x} - \mu_i)^t\right\} \quad (3)$$

where
n: number of characteristic parameters,
p(i): probability of preceding occurrence of sort i,
$\Sigma_i$: covariance matrix of sort i, (n × n),
$\mathbf{x}$: characteristic parameter vector, (1 × n), and
$\mu_i$: average value of the characteristic parameter of sort i.

When a nuclear area signal, a cytoplasmic area signal, a nuclear peripheral length signal, and the characteristic parameters $L_{CN}$ and $H_{CN}$ on densities according to this invention were employed as a group of characteristic parameters to be substituted into Eq. (3), the factor of recognition of the six sorts of the normal leukocytes was a value of 93.9%. When compared with a value of 89.5% in the prior-art case of employing the density ratios $n_R/c_R$ and $n_G/c_G$, the above recognition factor demonstrates the effectiveness of the method of quantizing the density relation according to this invention. The above fact applied in cases where algorithms other than the minimum distance method were employed as the recognizing algorithm.

Although this invention has thus far been explained by exemplifying the image signals of the leukocytes obtained through the red filter and the green filter, the same applies in cases of image signals in other wavelength regions. The combination of two colors (two wavelength regions) to be selected is not restricted to that of red and green. The organic cell is not restricted to the leukocyte, either.

We claim:

1. A cell classification method having a first step of obtaining as video signals, images of a plurality of sorts cells existent in a cell sample, a second step of calculating a plurality of characteristic parameters of each of the cells from the video signals, and a third step of recognizing the sort of said each cell with the characteristic parameters, characterized in that said second step comprises:
   the step of selecting at least one cell of a specific sort (at least one standard cell),
   the step of evaluating unstable characteristic parameters of said standard cell,
   the step of comparing the values of said unstable characteristic parameters with predetermined standard values of the corresponding characteristic parameters of the standard cell of said specific sort,
   the step of calculating adjustment values of said unstable characteristic parameters in the cell sample on the basis of the comparisons, and
   the step of obtaining first characteristic parameters with said unstable characteristic parameters adjusted by the use of said adjustment values.

2. A cell classification method having a first step of converting an image of each blood cell in a blood sample into video signals in a plurality of wavelength regions, a second step of calculating a plurality of characteristic parameters of said each blood cell from the video signals, and a third step of recognizing a sort of the blood cell with the characteristic parameters, characterized in that said second step comprises:
   the step of selecting at least one leukocyte of a specific sort (at least one standard leukocyte),
   the step of evaluating characteristic parameters on densities of said standard leukocyte,
   the step of comparing the evaluated characteristic parameters on the densities with predetermined standard values,
   the step of calculating adjustment values of said characteristic parameters on the densities on the basis of the comparisons, and
   the step of obtaining first characteristic parameters which are the characteristic parameters on the densities of other leukocytes in the blood sample as adjusted by the use of said adjustment values.

3. A cell classification method according to claim 2, wherein the step of selecting said standard leukocyte is carried out with a characteristic parameter on the shape of the leukocyte.

4. A cell classification method according to claim 2, wherein the step of selecting said standard leukocyte consists of selecting the neutrophil leukocyte among the leukocytes.

5. A cell classification method according to claim 2, wherein a nuclear density and a cytoplasmic density of the leukocyte in predetermined wavelength regions are employed as said characteristic parameters on the densities.

6. A cell classification method according to claim 1, further comprising:
   the step of obtaining from said first characteristic parameters, a correlation among these parameters, and
   the step of obtaining a second characteristic parameter from said correlation.

7. A cell classification method according to claim 2, further comprising:
   the step of obtaining from said first characteristic parameters, a correlation among these parameters, and
   the step of obtaining a second characteristic parameter from said correlation.

8. A cell classification method according to claim 7, wherein said correlation is a relative density which is obtained by subtracting a cytoplasmic density from a nuclear density of the leukocyte in a predetermined wavelength region.

9. A cell classification method according to claim 7, wherein said correlation is a relative density which is obtained by subtracting a cytoplasmic density from a nuclear density of the leukocyte in a predetermined wavelength region, and said second characteristic parameter is the relative density indicated by the Cartesian coordinates system.

10. A cell classification method according to claim 7, wherein said correlation is a relative density which is obtained by subtracting a cytoplasmic density from a nuclear density of the leukocyte in a predetermined wavelength region, and said second characteristic parameter is the relative density indicated by the polar coordinates system.

* * * * *